Oct. 11, 1955 E. M. SORENG ET AL 2,720,564
FLUID PRESSURE RESPONSIVE SWITCH
Filed July 14, 1952 2 Sheets-Sheet 1
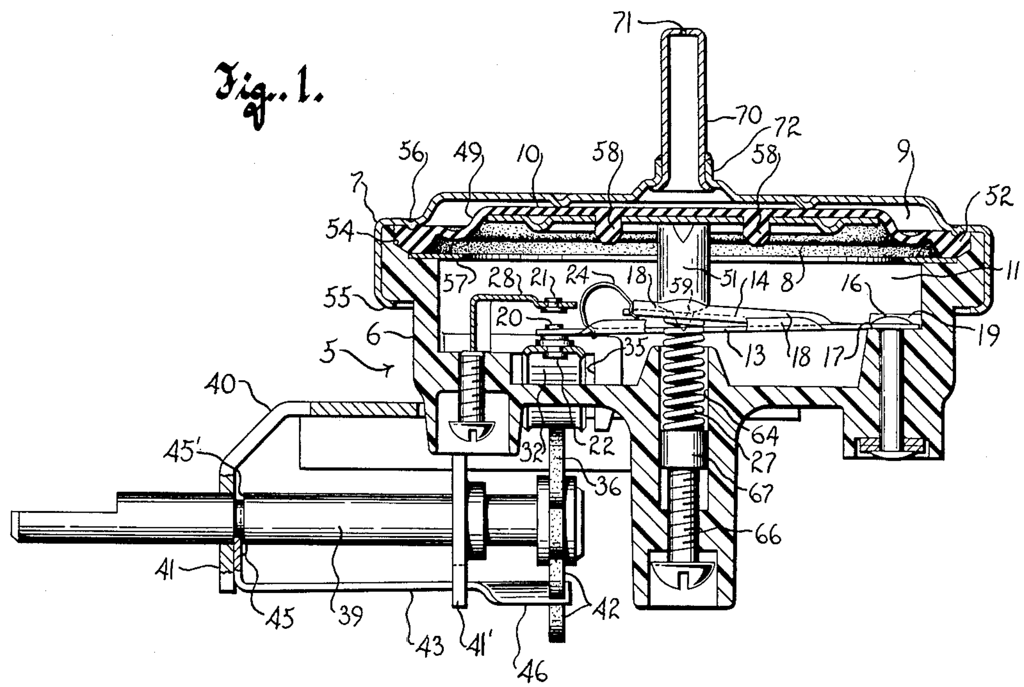
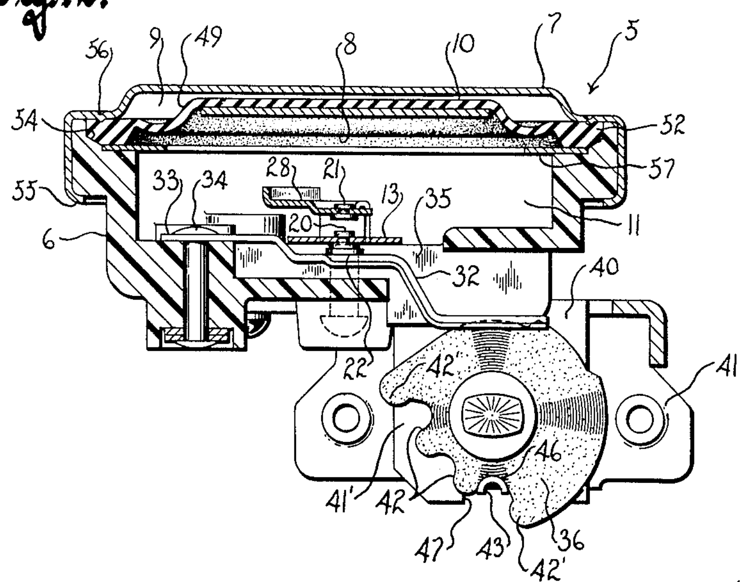
Inventors
Edgar M. Soreng
Irving Gebel
By Ira Milton Jones
Attorney FLUID PRESSURE RESPONSIVE SWITCH
Filed July 14, 1952 2 Sheets-Sheet 2
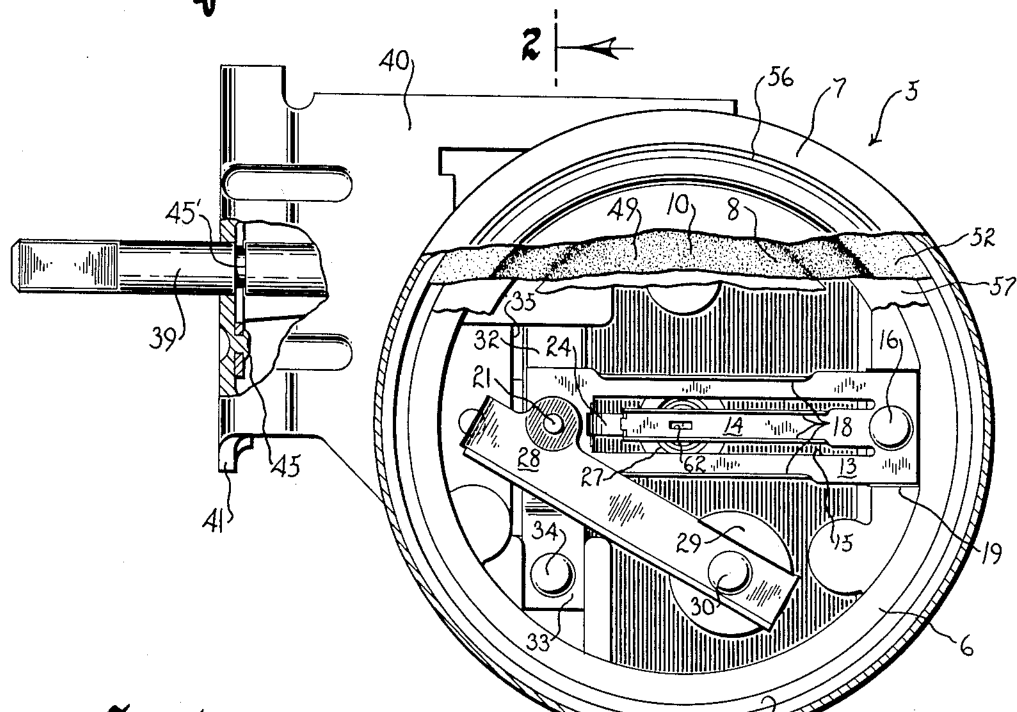
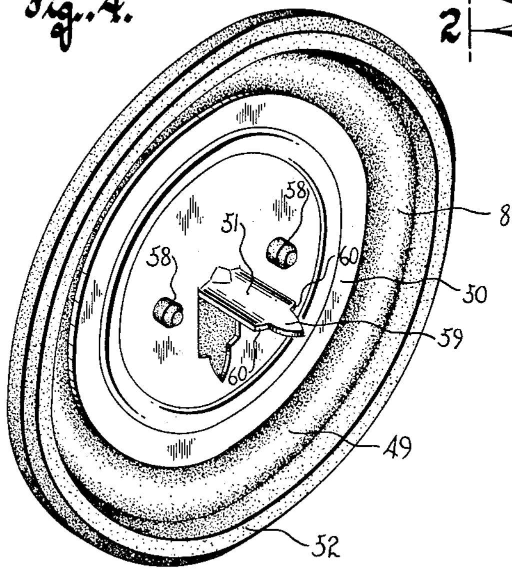
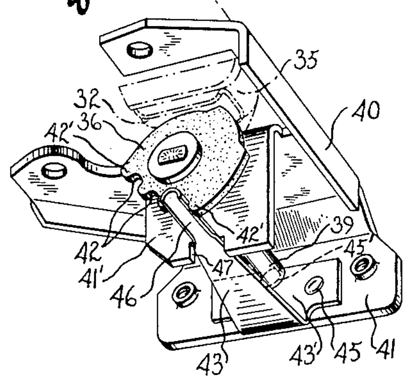
Inventors
Edgar M. Soreng
Irving Gebel
By Ira Milton Jones
Attorney United States Patent Office
2,720,564
Patented Oct. 11, 1955

1

2,720,564

FLUID PRESSURE RESPONSIVE SWITCH

Edgar M. Soreng, Skokie, and Irving Gebel, Oak Park, Ill., assignors, by mesne assignments, to Soreng Products Corporation, a corporation of Delaware Application July 14, 1952, Serial No. 298,873
5 Claims. (Cl. 200—83)

This invention relates to fluid pressure responsive mechanism and refers more particularly to an electric switch which is actuated to its switch-on and switch-off positions in consequence of variations in the pressure of a fluid.

Pressure responsive mechanisms of the type here under consideration are particularly useful in automatic washing machines, although their utility is by no means restricted to such devices; but since their application to automatic washers clearly illustrates the manner of their use and the features of the switch of the present invention, this device will be described with particular reference to its installation in a washing machine, and specifically with reference to its use for controlling the volume of washing liquor or water in the washing chamber or tub of such a machine.

Because the water or liquor in a washing machine is subjected to more or less constant and violent agitation during the operation of the machine, its surface level varies constantly, even though the volume of water in the tub may not change materially. It will be seen that under these conditions it would be impracticable to control the valve for regulating the volume of water in the tub by means of a liquid-level responsive device, such as a float arm, whereas a diaphragm type pressure-responsive device which is governed by the "head" of liquid in the washing chamber or tub will tend to provide more accurate control of the liquid level. Moreover, as is well known, diaphragm type pressure responsive switches like those here under consideration are capable of governing the closing of an electromagnetic valve or other mechanism at one pressure value and causing it to open at another. This differential between opening and closing pressures eliminates any tendency for the control mechanism to hunt, as would be the case if the control responded instantly to slight variations of the liquid level in the vessel, and also enables the control, in effect, to ignore transient changes in liquid level due to normal washing agitation or other circumstances which do not actually necessitate any change in the volume of liquid.

Although past pressure responsive devices of this type were relatively satisfactory in their ability to remain unaffected by transient fluid pressure variations, they have not been wholly satisfactory in this respect or, more accurately, resort has been made to relatively complex expedients for eliminating the effects of such transient variations. As an example of a recent attempt to overcome the problems created by transient pressure variations, reference may be had to the patent to J. C. Koonz et al., No. 2,502,326 issued March 28, 1950, wherein the compartment housing the switch mechanism is made substantially airtight and is communicated with the atmosphere through a very restricted passage so that the bleeding of air into and out of the switch compartment provides a restraint or dashpot effect upon the action of the diaphragm. Obviously a mechanism of this type is subject to serious service problems.

By contrast, it is a very important object of the present invention to provide an extremely simple and effective means for preventing transient fluctuations in fluid pressure from affecting the position of the diaphragm or switch mechanism controlled thereby in a fluid pressure operated switch device.

2

Another object of the present invention resides in the provision of an unusually simple and inexpensive diaphragm construction for a fluid pressure operated mechanism, wherein the diaphragm itself and the post or stud through which it transmits its motion to the member to be actuated comprise only two very simple and easily assembled components.

Still another object of the present invention resides in the provision of a fluid pressure operated switch of the character described having a switch actuating arm constrained to swinging motion toward and from a pressure responsive diaphragm and biased toward the diaphragm by means of a coil spring located at the side of the arm remote from the diaphragm, wherein a post or stud extending from the diaphragm toward said arm, to actuate the same, is steadied by the arm and in turn serves to steady the spring.

In keeping with the general overall objective of this invention, which is the provision of an inexpensive though entirely reliable pressure responsive switch of the character described, the invention has as another of its objects to provide simple manually adjustable means for setting the switch for operation at different pressures and a rugged, simply constructed mounting structure for the switch which has the pressure adjusting means embodied therein so that the mere attachment of the switch body to its mounting structure operatively associates the manual control means with the switch part to be set.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a longitudinal sectional view of the pressure responsive switch of this invention;

Figure 2 is a cross sectional view of the switch of this invention taken on the plane of the line 2—2 in Figure 3;

Figure 3 is a top view of the pressure responsive switch, portions being shown cut away to illustrate detail;

Figure 4 is a perspective view of the diaphragm assembly; and

Figure 5 is a perspective view illustrating particularly the construction of the switch mounting and the manually adjustable means for setting the pressure at which the switch operates.

Referring now more particularly to the accompanying drawings in which like numerals designate like parts throughout the several views, the numeral 5 designates generally a housing for a pressure responsive switch, comprising a shallow, cup-like insulative body portion 6, open at its top, and a closely fitting metal cover 7 closing the open top of the body portion. A diaphragm 8 extending laterally across the interior of the housing and having its peripheral portion clamped between the cover and the rim portion of the cup-like body divides it into two compartments—namely, an upper fluid tight compartment 9 in which air, water or other liquid is received to have contact with one face 10 of the diaphragm, and a lower switch mechanism compartment 11 in which is housed the control device that is actuated by the diaphragm.

In this instance the control device comprises an overcenter snap switch mechanism having a contactor blade 13 and an actuator blade 14, the two blades being formed from a single strip of spring metal having a substantially U-shaped slot 15 cut therein to define the actuator blade and render it movable with respect to the contactor blade. One end of the blade unit is anchored to the bottom wall 17 of the housing, at one side thereof, as by means of a rivet 16 which also serves to secure one of the switch terminals (not shown) to the housing. Both the actuator blade and the contactor blade are rendered rigid along the major portion of their lengths by means of integral flanges 18 along their side edges, but these flanges terminate a distance from the fixed ends of the blades to leave them free to flex, so that both blades are free to swing or flex flatwise toward and from the diaphragm; and a U-shaped shoulder 19 on the case, embracing the fixed end portion of the blade unit, restrains the blades against movement in other directions. A rivet-like contact point 20 on the free end of the contactor blade is engageable with either an upper fixed contact 21 or a lower fixed contact 22.

The free end of the actuator blade has a well known type of toggle connection with the contactor blade through a U-shaped rocker spring 24, so that downward movement of the actuator blade beyond a dead center position of the blades snaps the contactor blade upwardly into engagement with the fixed contactor 21, and vice versa.

The actuator blade is biased upwardly by means of a coiled compression spring 27 mounted beneath it in a manner to be described hereinafter, and the movable contact 20 on the contactor arm therefore normally engages the lower fixed contact 22. The upper fixed contact 21 is mounted on a rigid arm 28 which extends across the contact end of the contactor blade from a point laterally to one side thereof, the arm being secured at that point to a pad 29 in the bottom of the housing, as by means of a rivet 30 which extends through the housing bottom wall to provide for securement of another of the switch terminals (not shown) to the housing.

To enable adjustment of the amount of fluid pressure which will be required to actuate the switch, that is, to swing the actuator blade downward beyond dead center and thus cause the contactor to be snapped upwardly into engagement with the upper fixed contact, the lower fixed contact 22 is made adjustable toward and from the upper fixed contact. To this end the lower fixed contact is carried on the medially reinforced portion of a flexible arm 32 extending transversely across the free end portion of the contactor blade, beneath the same, and secured to the bottom wall of the housing at one of its ends 33, as by means of a rivet 34 which may likewise pass through the housing bottom wall to provide for securement of a third terminal (not shown) to the housing exterior. The free end portion of the flexible arm 32 extends downwardly through an opening 35 in the bottom wall of the housing into engagement with the periphery of an adjusting cam 36 at the exterior of the housing, and against which the arm is biased. This cam is rotatable to adjust the level of the lower fixed contact.

The cam is secured on the rear end of a control shaft 39 which is rotatably mounted in a bracket 40 secured to the underside of the housing. This bracket, which is stamped and formed of sheet metal, provides a rugged mounting for the switch and since it has the control shaft 39 journalled therein, the attachment of the switch housing to the bracket automatically operatively associates the cam 36 with the contact arm 32. As best shown in Figure 5 the stamped mounting bracket 40 has a pair of front and back legs 41 and 41′ depending from its top wall to which the switch body is fastened, the front leg being provided with mounting holes to receive the fastening screws or rivets by which the entire unit is mounted on the panel or wall of the washing machine which is to support the same.

The control shaft 39 is journalled in aligned holes in the legs 41 and 41′ and has its front end portion projecting beyond the front leg 41 to pass through the panel or wall of the washing machine upon which the unit is mounted. A control knob (not shown) may be secured directly (or indirectly) to the front end of the shaft 39 so that the shaft and hence the cam fixed thereto may be turned to adjust the lower contact 22 to any one of several positions.

These positions of adjustment are determined by the engagement of an indexing finger 43 in detent notches 42 in the edge of the cam opposite that engaged by the arm 32. Stop abutments 42′ on the cam collide with the sides of the indexing finger to define the range of adjustment of the cam. This indexing mechanism forms part of the subject matter of the copending application of Irving Gebel, Serial No. 487,880, filed February 14, 1955.

The indexing finger is stamped from suitably resilient metal and has an upturned attaching base 43′ by which the indexing finger is secured to the bracket 40 by having the base riveted as at 45 to one side of the front leg 41, preferably the inner side thereof. For simplicity and ease of assembly the rivets 45 preferably comprise localized extrusions of the leg 41 which pass through holes in the attaching base 43′ of the indexing finger and are peened over.

The attaching base 43′ of the spring arm has a U-shaped notch in its top edge which engages in an annular groove 45′ in the shaft 39. This simple expedient constitutes the sole means of holding the shaft against axial displacement and properly locating the cam with respect to the contact arm 32.

Though the free end 46 of the indexing finger engages the cam with a smoothly rounded surface provided by a convexly curved cross section, there is substantial side thrust thereon as the cam is turned from one position to another and, of course, when either of the stop abutments 42′ engages the indexing finger, accidental rotation of the shaft in the wrong direction might actually bend the indexing finger unless reinforcement were provided therefor. Such reinforcement is given the indexing finger by the simple expedient of having its free end portion confined in a notch 47 in the bottom edge of the rear leg 41′.

The novel pressure responsive diaphragm of the switch of this invention comprises only two elements, namely a resilient membrane 49 of rubber, neoprene or the like, and a substantially rigid disc-like metal stamping 50 which is smaller in diameter than the membrane and which has an integral post or stud 51 struck up from its body portion substantially perpendicular thereto and coaxial therewith. Preferably, of course, the membrane and the metal stamping are both circular in outline and the marginal edge portion of the membrane is relatively thick, as at 52, so as to provide in effect a gasket whereby a good seal between the two compartments of the housing will be afforded. In this connection it will be noted that the side wall of the insulative body 6 of the housing is substantially cylindrical and has an annular recess 54 just inside its mouth in which the gasket-like margin 52 of the membrane is received. The cover 7 of the housing fits snugly around the body portion thereof and is crimped or rolled under an annular downwardly facing shoulder on the exterior of the body, as at 55, so as to be held securely in place. The cover has an inwardly depressed annular rib 56 which engages the upper surface of the thick margin of the membrane so as to engage the same under pressure and thus assure a good seal between the cover and diaphragm. Proper seating and flexing of the membrane is further assured by the provision of a washer-like metal gasket 57, interposed between the margin of the membrane and the upwardly facing shoulder inside the mouth of the housing.

The rigid disc or pressure plate 50 of the diaphragm is held in position flatwise overlying the lower surface of the membrane by means of a pair of integral tits 58 projecting downwardly from the lower surface of the membrane through substantially closely fitting holes in the disc. It will be seen that the two components of the diaphragm may thus be very readily assembled by simply inserting these tits into their respective holes with a very small amount of pressure.

It will be further apparent that this novel connection between the membrane and the stamped metal pressure plate leaves the membrane imperforate, so that the entire upper face thereof is exposed in the diaphragm chamber, and so that there is a negligible possibility of leakage of the diaphragm due to the presence of a rivet or fastener hole at its center, such as was formerly used to hold the diaphragm clamped between two pressure plates. Furthermore, the diaphragm membrane of this invention will have a longer useful life because it is subjected to less flexure into engagement with the edges of the pressure plate.

The post or stud 51 which extends down from the stamped diaphragm member has a pointed reduced free end portion 59 defining shoulders 60 flanking the same, and this reduced portion of the post extends through a relatively narrow locating slot 62 in the actuator blade, which slot is directly below the central zone of the diaphragm. The shoulders 60 on the stud engage the actuator blade adjacent to the opposite ends of the slot in order to transmit downward force from the diaphragm to the blade, and it will be noted that these shoulders are rounded slightly to accommodate rocking motion of the actuator blade relative to the post in consequence of swinging movement of the blade during its normal switch actuating movements. This connection between the post and the actuator, together with the resilience of the diaphragm, effectively mounts the post for a limited degree of universal motion with respect to the actuator blade, thereby compensating for any possible misalignment between the disc and the slot in the actuator blade.

The compression spring 27 reacting between the housing and the actuator blade determines the amount of pressure which will be required to swing the blade downward past the dead center position and thus trip the contactor blade upward to the position in which the movable contact 20 thereon engages the upper fixed contact. This spring has its lower portion received in a well 64 in the bottom of the housing, which well is coaxial with the diaphragm and the post 51, and its uppermost coils are piloted on the pointed free end portion 59 of the post which projects through the slot in the actuator blade, so that the outer end of the spring is conjointly steadied by the post and the actuator blade. The spring is held under compression by a screw 66 which is threaded upwardly through the bottom of the well, a cylindrical block 67 slidable in the well being interposed between the lower end of the spring and the shank end of the screw. By means of the screw 66 the compression on the spring, and hence the amount of pressure required to trip the switch may be accurately adjusted. Thus, assuming that the pressure responsive switch of this invention is used to control an electromagnetic valve, and that engagement of the contactor blade with the upper fixed contact effects closure of the valve and with the lower fixed contact effects opening of the valve, the pressure at which the switch will effect opening of the valve will be regulated by adjustment of the cam 36. Preferably the set screw has a thread of slightly different pitch than that of the hole in which it seats, so that the screw will be self-locking and will thus be restrained against any possibility of turning in response to vibration.

The fluid compartment or diaphragm chamber 9 of the device has a nipple 70 secured in the cover 7 and connectible in any suitable fashion with the washing chamber or other vessel in which the liquid level is to be controlled, and a restriction 71 in this nipple provides a very small orifice to assure against actuation of the switch in response to transient pressure fluctuations. It will be apparent that because of its small size this orifice will permit fluid to bleed into and out of the diaphragm chamber 9 at a relatively slow rate such that transient fluctuations in pressure will cause little, if any, change in the pressure of fluid in the compartment 9 and consequently these transient fluctuations of pressure will not actuate the switch mechanism. Preferably the nipple 70 comprises a blind eyelet soldered into an annular flange 72 which is extruded from the center of the cover in consequence of punching the hole in the cover in which the nipple seats.

From the foregoing description taken together with the accompanying drawings, it will be readily apparent that this invention provides a greatly improved and extremely simple and entirely reliable pressure responsive switch especially well adapted for use with automatic washing machines and that the improvement it effects results from its novel diaphragm construction which comprises only two simple and inexpensive components; from the fact that transient pressure fluctuations will not cause undesirable actuation of the control mechanism; from the fact that the novel diaphragm construction enables the actuating blade for the control mechanism to cooperate with the diaphragm to steady the post by which motion is transmitted from the diaphragm to the blade and which also makes possible the use of a portion of the post to steady the compression spring which biases the blade toward the diaphragm; and finally because of the simple, rugged way in which the switch is mounted and the manual control for its pressure range is incorporated and assembled with the switch mechanism.

What we claim as our invention is:

1. A fluid pressure responsive instrumentality having a diaphragm assembly for translating variations in the pressure of fluid imposed upon one side of the diaphragm into swinging movement of an actuating lever at the other side of the diaphragm which lever is constrained to swing in an arcuate path substantially normal to the diaphragm, said instrumentality being characterized by a resilient diaphragm member having a plurality of integral spaced apart tits extending from said other side thereof, and a smaller stamped metal diaphragm member having substantially closely fitting holes in which said tits are received to be held thereby in flatwise juxtaposition to said other side of the resilient member; further characterized by an integral post struck up from said stamped metal diaphragm member and extending substantially perpendicular to the surface thereof toward the actuating lever along its path of motion; and further characterized by a reduced free end portion on said post received in a slot in the lever and flanked by a shoulder on the post engageable with the lever so as to enable endwise motion of the post in response to diaphragm motion in one direction to be translated into swinging motion of the lever in one direction, while at the same time the lever steadies the post.

2. In a pressure responsive switch: a housing; a resilient membrane extending across the interior of the housing to divide the same into two compartments, in one of which compartments switch mechanism is housed and into the other of which fluid may be introduced so that variations of the pressure of the fluid may be imposed upon the membrane; a switch actuating lever in said first named compartment having a portion overlying the central zone of the membrane and constrained to swinging motion toward and from the membrane in a path substantially normal thereto; a disc-like stamped metal diaphragm member smaller than said membrane and overlying the central zone thereof at the surface of said membrane facing the said lever; an integral post struck up from the body of said metal diaphragm member and extending substantially perpendicular thereto, said post having a reduced free end portion received in and passing through a locating aperture in said lever and having shoulders adjacent said free end portion engaged with the lever to translate pressure responsive flexing of the membrane in one direction into swinging motion of the lever in the same direction; a connection between the membrane and said metal diaphragm member comprising a plurality of integral tits on the membrane extending through substantially close fitting holes in the metal diaphragm member to prevent relative movement between the membrane and the metal disc; and a coiled compression spring reacting between the housing and the lever to bias the latter toward the membrane, said compression spring being held in position by having one of its ends received in a well in the housing coaxial with the post and its other end piloted on the free end portion of the post which projects through said lever.

3. In a pressure responsive mechanism having a housing: a resilient diaphragm member extending across the housing and coperating therewith to define two compartments, one of said compartments having an inlet into which fluid may be introduced in contact with one face of the diaphragm so that variations in the pressure of the fluid will flex the diaphragm, and the other of which compartments houses mechanism to be actuated by the diaphragm, said diaphragm member having a plurality of upstanding tits on its other face; a substantially rigid disc, smaller than the resilient diaphragm member and flatwise overlying said other face of the resilient diaphragm member and having substantially closely fitting holes through which said tits project to secure the disc to the resilient diaphragm member, so that flexing motion of the resilient member in response to variations in fluid pressure may be transmitted through the disc to the mechanism in said other compartment; and means on said inlet of the housing defining a restricted orifice through which said first named compartment may be communicated with a source of fluid, so that transient variations in the pressure of the fluid at said source will not be imparted to the diaphragm but variations of longer duration will be impressed thereon.

4. In a fluid pressure responsive mechanism having a diaphragm assembly for translating variations in the pressure of fluid imposed upon one side of the diaphragm into movements of an actuating lever at the other side of the diaphragm which is swingable toward and from the diaphragm along a fixed path substantially normal to the diaphragm; an imperforate resilient diaphragm member having a plurality of spaced apart integral tits extending from one face thereof; a substantially rigid disc of lesser diameter overlying said other face of the resilient diaphragm member and having closely fitting holes through which said tits extend to thereby hold said disc in flatwise juxtaposition to the diaphragm member; a post extending between the disc and lever for translating flexing motion of the diaphragm in response to variations in fluid pressure into swinging motion of the lever in one direction; and means connecting the post with said lever and with said disc and permitting the post to have limited universal swiveling motion with respect to the lever, said means including a reduced end portion on said post received in a recess in the lever.

5. In a pressure switch: a hollow housing; a flexible imperforate diaphragm secured to the housing and extending thereacross to define a pressure chamber at one side of the diaphragm and a switch compartment at the opposite side of the diaphragm, said opposite side of the diaphragm being exposed to the switch compartment; switch means in said compartment, said switch means including an arm having a portion constrained to back and forth motion along a path substantially normal to the diaphragm; a post extending lengthwise between the diaphragm and said portion of the arm; a disc interposed between the diaphragm and the end of the post adjacent thereto, said disc resting flatwise on said opposite side of the diaphragm; a connection between the disc and the adjacent end of the post precluding lateral displacement between the disc and said adjacent end of the post, and whereby flexure of the diaphragm in response to pressure in the diaphragm chamber is translated into endwise motion of the post toward said arm; and a substantially universal joint connection between the other end of the post and said arm precluding lateral displacement of the post with respect to said arm, whereby the post is supported entirely by said arm and the disc and the endwise motion of the post is guided by the arm.

References Cited in the file of this patent

UNITED STATES PATENTS

| | | |
|---|---|---|
| 2,438,202 | Burns | Mar. 23, 1948 |
| 2,515,356 | Puderbach | July 18, 1950 |
| 2,547,050 | Simmons | Apr. 3, 1951 |
| 2,590,419 | Koonz et al. | Mar. 25, 1952 |
| 2,615,104 | Hosford | Oct. 21, 1952 |

FOREIGN PATENTS

| | | |
|---|---|---|
| 346,756 | France | Dec. 9, 1904 |